(12) United States Patent
Samii et al.

(10) Patent No.: US 8,304,113 B2
(45) Date of Patent: Nov. 6, 2012

(54) POLYOLEFIN AND CERAMIC BATTERY SEPARATOR FOR NON-AQUEOUS BATTERY APPLICATIONS

(75) Inventors: Garrin Samii, Laguna Hills, CA (US); Banafsheh Behnam, Arlington, MA (US); David Veno, Woburn, MA (US); Abbas Samii, Belmont, MA (US)

(73) Assignee: Advanced Membrane Systems, Inc., North Billerica, MA (US)

( * ) Notice: Subject to any disclaimer, the term of this patent is extended or adjusted under 35 U.S.C. 154(b) by 1188 days.

(21) Appl. No.: 11/682,079

(22) Filed: Mar. 5, 2007

(65) Prior Publication Data

US 2011/0171523 A1    Jul. 14, 2011

(51) Int. Cl.
*H01M 2/16* (2006.01)

(52) U.S. Cl. ........ 429/252; 429/247; 429/249; 429/251; 429/254

(58) Field of Classification Search ............. 429/129, 429/247, 249, 251, 252, 254
See application file for complete search history.

(56) References Cited

U.S. PATENT DOCUMENTS

| | | | |
|---|---|---|---|
| 3,351,495 A | 11/1967 | Larsen | |
| 4,287,276 A | 9/1981 | Lundquist | |
| 4,650,730 A | 3/1987 | Lundquist | |
| 5,079,287 A * | 1/1992 | Takeshi et al. | 524/528 |
| 5,565,281 A | 10/1996 | Yu | |
| 5,641,565 A * | 6/1997 | Sogo | 428/315.7 |
| 5,738,955 A * | 4/1998 | Gardner et al. | 429/140 |
| 5,922,492 A | 7/1999 | Takita | |
| 6,096,213 A | 8/2000 | Radovanovic | |
| 6,180,282 B1 | 1/2001 | Nishida | |
| 6,372,379 B1 | 4/2002 | Samii et al. | |
| 6,514,333 B1 * | 2/2003 | Yuan et al. | 106/486 |
| 6,562,519 B2 | 5/2003 | Yamamoto | |
| 6,566,012 B1 | 5/2003 | Takita | |
| 6,949,315 B1 | 9/2005 | Samii | |
| 2003/0219587 A1 * | 11/2003 | Pekala | 428/304.4 |
| 2006/0007765 A1 * | 1/2006 | Watanabe et al. | 365/202 |
| 2008/0057389 A1 * | 3/2008 | Kono et al. | 429/144 |
| 2008/0096102 A1 * | 4/2008 | Hatayama et al. | 429/122 |

FOREIGN PATENT DOCUMENTS

CA              2611275 A1 * 12/2006
WO  PCT/US2005/037135       4/2006

* cited by examiner

*Primary Examiner* — Patrick Ryan
*Assistant Examiner* — Sean P Cullen
(74) *Attorney, Agent, or Firm* — Verrill Dana, LLP; Chris A. Caseiro

(57) ABSTRACT

A ceramic microporous polyolefin battery separator membrane, high in air permeability, low in shrinkage and improved temperature resistance addresses the safety requirements of lithium ion batteries. The separators made by the current invention consists of one or more polyolefin polymers and kaolin fillers comprised of aluminum oxide and silicon oxide. The membranes of current invention have a thickness of 5-200 microns, air permeability of 1-200 sec/10 cc (Gurley seconds), and average pore diameter of less than 1 micron.

3 Claims, No Drawings

POLYOLEFIN AND CERAMIC BATTERY SEPARATOR FOR NON-AQUEOUS BATTERY APPLICATIONS

BACKGROUND OF THE INVENTION

Safety is a major concern when using lithium ion batteries (LIB) in hybrid electric vehicles (HEVs), pluggable HEVs and EVs. A separator that can improve the safety issues associated with LIBs and also meets assembly and cell performance requirements as well as the cost criteria is needed for the HEV applications. This invention describes and claims such an improved separator.

Currently there are two types of secondary lithium ion batteries:

1. Those with cathode containing cobalt for high energy density batteries used in cell phones, notebook PCs and consumer electronics, which require a shutdown temperature activation of 130-150° C. and melt integrity of more than 150° C.; and 2. Those with a non-cobalt cathode (mostly phosphate based) for high power batteries, which do not require a shutdown temperature capability, but must have a separator with high temperature resistance.

Lithium-ion cells have two to three times higher energy density than nickel metal hydride batteries used in the current HEVs. Due to this high energy density of lithium ion batteries, automakers are eager to replace the currently used nickel metal hydride battery packs in HEVs with a high power and high density lithium ion battery pack. Thus far, the safety issue (due to potential thermal run away of lithium ion batteries) has been a major problem, preventing the use of lithium ion batteries in the HEV applications. Among all of the commercially available polyolefin separators for LIB applications, none could pass the safety requirements for HEV applications. The only battery separator that is commercially available and has proven that it meets the safety requirements of HEVs is a ceramic separator called Seperion® from Deggusa, the international chemical company headquartered in Dusseldorf, Germany. Seperion is produced by a non-woven polyethylene terephthalate (PET) precursor impregnated on both sides with ceramics containing nano particles of $Al_2O_3$ and $SiO_2$. Safety tests done by Deggusa, Sandia National Labs and the US Army Research Labs have proven that indeed Seperion does improve the safety problems associated with LIBs. Zhang et al. reported:

"In nail penetration test on the 8 Ah Li-ion pouch cells, it was shown that the maximum temperature of the cell using Seperion separators was only 58° C. with a weight loss of 0.5% after nail penetration test, while that of the control cell using PE separators reached over 500° C. with a weight loss as high as 56.1%. Since the maximum temperature (58° C.) in the nail penetration test is far from the melting point of the PE materials, one may assume that the exceptional safety behavior of the Seperion separator is more related to the nano-size ceramic materials, instead of PET non-woven matrix." S. S. Zhang, et al. "Journal of Power Sources 164 (2007) pp. 351-364.

However, due to a complicated phase inversion manufacturing process that has been used in the production of the Seperion separator, it has not been produced at a low cost, and therefore, it does not meet the cost criteria of lithium ion batteries in general and HEV/EVs in particular. In the current invention, in addition to offering comparable safety features, this invention replaces $Al_2O_3$ and $SiO_2$ with kaolin (a low cost clay mineral filler consists of $Al_2O_3$ and $SiO_2$), and utilizes a low cost process. The current invention does not require a nonwoven material and subsequently conversion to a microporous membrane using an expensive phase inversion method. The wet process used in the current invention has proven track records; it is simple and has been used in the production of low cost lead acid PE separators for decades.

One aspect of the current invention provides a high performance low cost ceramic-like microporous separator high in air permeability of less than 200 sec/10 cc, preferably less than 10 sec/10 cc, and with a shutdown temperature between 130-150° C. This invention also provides a method for producing the same for consumer LIB applications.

Another aspect of the current invention provides a non-shutdown polyolefin ceramic type microporous separator with high abuse tolerance but with relatively low cost that meets both the safety and cost requirements of LIBs for EV/HEV applications.

The microporous membranes of current invention will have applications in air filtration, water purification (a filter for separating microorganisms and viruses from water), size exclusion, sanitary napkins, breathable closing and house wrap.

Inert fillers are also used in the production of battery separators, primarily for achieving better pore structures (added tortousity) and increased porosity. However, fillers can also add properties such as structural integrity (high puncture resistance), reduced shrinkage, improved thermal stability, and fire retardation. They also keep the battery electrodes separated at high temperatures.

Examples of polymeric sheets with inert fillers include those described in U.S. Pat. Nos. 3,351,495, 4,287,276, and U.S. Pat. Nos. 6,372,379 and 6,949,315 (by current authors), in which, the electrolyte is capable of passing through the separator through microporous channels.

In U.S. Pat. No. 6,949,315 by the current inventors, $TiO_2$ filler is used to improve the high temperature resistance of the separator. Addition of $TiO_2$ to the formulation did indeed improve the thermal resistance of the separator, however, $TiO_2$ is a heavy mineral (has a density of about 4.2 $gr/cm^3$) and is also very expensive and not particularly affordable to be used abundantly in commercially priced separators for lithium ion batteries. Kaolin clay, in contrast, has lower density (density of 2.6 $gr/cm^3$), is very stable in the lithium ion battery environment and is relatively inexpensive. In addition, kaolin clay has the capability to absorb significantly more oil than $TiO_2$ (it creates more air permeability) that leads to higher ionic conductivity of the separator.

Silica has also been used as a low-cost filler in battery separator applications for decades. However for use in lithium ion battery applications silica alone, without the presence of the aluminum oxide, may not improve the high temperature performance of the separator. In addition, due to silica filler's high moisture content, it may not be suitable for lithium ion batteries.

Kaolin clay is an abundant mineral and is a common constituent of the earth's crust. Clay occurs in many different forms, but kaolin or china clay is the purest and most versatile. Kaolin clays contain $Al_2O_3$ and $SiO_2$ with similar high heat resistance property as the ceramic material used in the Seperion separator, but cost significantly less. That is why Kaolin clays are commonly used in paints, paper, plastics, rubber, ink, pigments, fiber glass, cosmetics, cement and concrete, adhesive and sealants, cable and wire. They further have advantageous properties of hardness, opacity, abrasion resistance, high brightness, and particle size. They promote flattening and easy dispersion.

Calcined Kaolin, another inert filler appropriate for use in the present invention, is an anhydrous aluminum silicate produced by heating ultrafine natural kaolin to high temperatures in a kiln. The calcination process increases whiteness and hardness, improves electrical properties, and alters the size and shape of the kaolin particles.

Kaolin clay's nominal chemical properties are generally described as follows: Silicon dioxide (wt %)=56.91, Iron oxide=0.93, Aluminum oxide=39.68, Titanium dioxide=0.54, Calcium oxide=0.16, Magnesium oxide=0.16, Sodium oxide=0.60, and Potassium oxide=0.60

Clean kaolins are calcined by firing the powder in a rotary calcining kiln to a temperature high enough to effect loss of crystal water (and accompanying mineral change). Calcined kaolin normally converts to mullite during this process. Based on where kaolin has been mined, the above chemical properties could slightly vary in the composition of their trace elements.

For both shutdown and non-shutdown separators, the current invention uses between 5% to 80% by weight kaolin, more preferably calcined kaolin as property enhancing filler (to achieve high heat resistance) in the microporous membrane's formulations. In another version of this invention, kaolin clay can be replaced with materials consisting $Al_2O_3$ and $SiO_2$. However, $Al_2O_3$ and $SiO_2$ may not be as economical as kaolin in this application.

Different polyolefin polymers have been used in prior arts for making battery separators used in different applications, including lead acid, alkaline and lithium ion batteries. Polymers used in the current invention are selected from ultra high molecular weight polyethylene (UHMWPE with molecular weight more than 1 million) and polypropylene (PP with a melt index of less than 2) or a mixture thereof as frame polymers and a high-density polyethylene (HDPE) having molecular weight between 300,000 to 900,000 for achieving shutdown behavior between 130-150° C. For heat resistance separators (non-shutdown), the current invention uses UHMWPE, with molecular weight more than 1 million, and PP or a mixture thereof without HDPE.

The current invention basically utilizes a commonly used prior art method widely used for producing battery separators for lead acid, alkaline and lithium ion cells. This process starts by mixing and extruding polymers, filler (in this case, kaolin, calcined kaolin or a mixture of $Al_2O_3$ and $SiO_2$), with a plasticizer (oil) at high temperatures and pressure through a film die, casting the sheet, and wet stretching, either uni-axial or biaxial. Followed the wet stretching the oil is removed by solvent extraction and heat setting, creating a microporous sheet. To achieve higher air permeability, the stretching should be done after the extraction step.

OBJECTS OF THE INVENTION

Against the foregoing background, it is a principal object of the present invention to provide microporous articles especially suitable for use as battery separators and which possess improved properties with regard to their intended use in lithium ion cells.

It is another object of the present invention to provide such microporous articles which possess improved air permeability, and which are low in electrical impedance.

It is yet another object of the present invention to provide such microporous articles which possess high thermal resistance.

It is yet another object of the present invention is to produce battery separators having improved safety features for use in lithium ion cells.

In yet another object of the present invention thermal runaway is avoided.

In yet another object of the present invention adequate shutdown behavior is provided.

In yet another object of the present invention high thermal resistance is provided.

It is yet another object of the present invention to provide an enhanced holding capacity and a uniform surface appearance when wound on a winding tube is provided for spiral wound separators.

It is yet another object of the present invention to provide an enhanced holding capacity and a uniform surface appearance when used in enveloping by an enveloping machine for prismatic cells, therefore increasing the electrolyte retention, wicking action and ease of assembly.

It is yet another object of the present invention to provide battery separators that have lower material costs and can also be mass-produced at relatively low costs.

SUMMARY OF THE INVENTION

In accordance with one aspect of the current invention battery separator is comprised of a mixture of kaolin clay and polyolefin.

In accordance with a second aspect of the invention, the battery separator has a thickness of 5 to 250 μm and air permeability of 1 to 200 sec/10 cc.

In accordance with a third aspect of the invention the kaolin clay further comprises calcined kaolin.

In accordance with a fourth aspect of the invention the polyolefin further comprises an ulthira high molecular weight polyethylene (UHMWPE) having a minimum average molecular weight of $1\times10^6$.

In accordance with a fifth aspect of the invention the polyolefin is a mixture of UHMWPE having a minimum average molecular weight of $1\times10^6$ and a polypropylene (PP) having a melt index of 2 or less, and wherein the weight ratio of UHMWPE to PP is 50% or more.

In accordance with a sixth aspect of the invention the weight percentage ratio of the kaolin clay in the mix is between 20 to 80%, and wherein the separator is not subject to shutdown, regardless of temperature.

In accordance with a seventh aspect of the invention the microporous membrane has a melt integrity of 150° C. or higher.

In accordance with an eighth aspect of the invention the polyolefin comprises a mixture of 10% to 50% by weight of UHMWPE having minimum average molecular weight of $1\times10^{6^1}$ and 40% to 70% by weight of a high density polyethylene having an average molecular weight between 300,000 to 800,000.

In accordance with a ninth aspect of the invention the weight percent of calcined kaolin in the mixture is between 5% and 20%.

In accordance with a tenth aspect of the invention the battery separator has shutdown activation between 130° C. and 150° C.

In accordance with an eleventh aspect of the invention the melt integrity of the battery separator is 150° C. or higher.

In accordance with a twelfth aspect of the invention the battery separator is comprised of between 20% and 80% by weight of synthetic $Al_2O_3$ and between 20% and 80% by weight of $SiO_2$, and polyolefin, the battery separator having a thickness of 5 to 250 μm and an air permeability of 1 to 200 sec/10 cc.

DETAILED DESCRIPTION OF THE INVENTION

A microporous battery separator made by wet process comprised of polyolefin and kaolin filler. Kaolin, a mineral consisting of $Al_2O_3$ and $SiO_2$, is found extensively in Kaolin clay. More preferably calcined kaolin may be used.

The polyolefin can be selected from ultra high molecular weight polyethylene (UHMWPE) having an average molecular weight of $1\times10^6$ or higher, polypropylene with melt index of less than 2 and high-density polyethylene with average molecular weight of 300,000-900,000 and the mixture thereof.

The wet process starts by mixing and extruding a polymer and filler, in this case kaolin, with a plasticizer (oil) through a sheet die, calendaring/casting the sheet, followed by solvent extraction and then dry stretching/heat setting. Due to high oil absorbency of kaolin the microporous membranes produced with this method will have very high air permeability (low Gurley number). The presence of kaolin in the separator of the current invention will contribute to its high heat resistance properties and will stop thermal runaway in LIB cells.

The process by which the proposed separators are made is broadly comprised of making a microporous membrane by forming a homogeneous admixture of one or more polyolefin polymers, including a suitable plastisizer (oil) for the polyolefin and including a particulate filler, as described herein below.

The specific methods for making these membrane sheets are well known in prior art. By way of non-limiting examples, the following references use the similar wet technology, U.S. Pat. Nos. 3,351,495; 4,287,276 and those from the same inventors, U.S. Pat. Nos. 6,372,379 and 6,949,315.

Regarding the preferred method for making the membrane with high heat resistance, the components of the admixture are: an ultra high molecular weight polyethylene (UHMWPE) having an average molecular weight of $1\times10^6$ or more and a kaolin or calcined kaolin.

Alternatively a mixture of ultra high molecular weight polyethylene having an average molecular weight of $1\times10^6$ and PP with melt index of less than 2 with same fillers are used.

For making a membrane with shutdown behavior, the formulation will consist of a UHMWPE having an average molecular weight of $1\times10^6$ or more as a frame polymer, and a shutdown polyethylene having an average molecular weight between 300,000 to 900,000 and kaolin or calcined kaolin (or a mixture of $Al_2O_3$ and $SiO_2$) filler.

Dry blend composition for high temperature resistance and no shutdown is based on required properties such as tensile and puncture strength. Therefore, the amount of calcined kaolin in the separator formulation could be between 20 and 80 percent by weight. More preferably, this amount should be between 30 and 50 percent by weight. For a shutdown separator, the amount of calcined kaolin should be less than 20 percent by weight in the dry blend. More preferably this amount should be between 5 and 15 percent by weight.

The present invention also provides a method for producing microporous polyolefin membranes which are comprised of some general steps of (a) preparing the above dry blend and (b) extruding the dry blend with from 30 to percent by weight of suitable plasticizer, typically oil, through a film die, and (c) casting/calendering the gel-like extrudate (d) removing the plasticizer using a solvent extraction method (e) based on the formulation, stretching and heat setting the extracted material in both directions at 115 to 140 degrees C.

Other minor additives such as carbon black, most commonly used in prior art for different reasons such as increasing the surface area or general appearance, can also be incorporated in the formulation. Carbon black pellets made from a mixture of carbon black and high density or low density polyethylene are generally commercially available.

In accordance with the prior art, conventional stabilizers or antioxidants may be employed in the compositions of the present invention to prevent thermal and oxidative degradation of the polyolefin component. Representatives of the stabilizers are 4,4 thiobis (6-tert-butyl-m-cresol) ("Santonox"), and 2,6-di-tert-butyl-4-methylphenol ("Ionol").

The microporous sheet material made by this method should be a film that is less than 250 microns and preferably less than 25 microns in thickness. The air permeability of the microporous membrane of the present invention is between 1 to 200 Gurley seconds (sec/10 cc), preferably between 1 to 50 Gurley seconds and, and a heat resistance of more than 150° C., preferably between 165 to 200° C.

The following test methods were used for measurements:
(1) Thickness—Thickness (mil or micron)—is determined using a precision micrometer.
(2) Air permeability—measured by using a Gurley densometer (Model 4120), ASTM-D726(B)-Gurley is the time in seconds required to pass 10 cc of air through one square inch of product under a pressure of 12.2 inches of water.
(3) Shutdown—measured using the method described by Spotnitz, et al. R. Spotnitz, et al. "Shutdown Battery Separators", The $12^{th}$ Intl. Sem. Primary & Secondary Battery Technology and Applications, 1995.
(4) Melt integrity measured using thermal mechanical analysis (TMA), it is a the temperature that a strip of 1 mil thick membrane (1" width and 6" length) can no longer hold a 5 gram weight
(5) Shrinkage—measured in both directions after 60 min at 90° C.
(6) Tensile strength—calculated in machine direction by measuring percent offset at 1000 psi
(7) Puncture resistance measured by pressing a cylindrical pin (2 mm diameter) with a hemispherical tip through a sample. The maximum load occurring is a measure of the puncture resistance.

The invention will be explained in more detail by reference to the following Examples, but the invention should not be construed as being limited by these Examples in any way.

This invention primarily based on using kaolin or Calcined kaolin with a polyolefin to construct microporous membranes, however, kaolin can be replaced by its main constituent metal oxides, a mixture of $Al_2O_3$ and $SiO_2$ (20 to percentage by weight $Al_2O_3$ and 20 to 80 percentage by weight of $SiO_2$). The kaolin, particularly in the form of kaolin clay, is clearly more cost competitive than the other forms of this chemical compound.

EXAMPLE 1

A dry-blend consisting of 50% by weight of a UHMW polyethylene having Mw of $1\times10^6$, 50% by weight of kaolin with density of 2.6 was prepared. The mixture was fed into an extruder. The dry blend mixture was melt-kneaded in the extruder while feeding 60% by weight of liquid paraffin making a solution.

The above solution was extruded from a film die into the form of a sheet. Using a two-roll casting roll, the gel sheet was subsequently cooled down producing a 2 to 4 mil thick gel sheet. The liquid paraffin in the gel sheet was extracted by solvent and dried. The dried microporous sheet was subsequently stretched in both directions at 125° C. for 100% and also heat set at 120° C., producing a 25 microns thick microporous membrane.

The sample produced above was tested for air permeability (Gurley number), shutdown and melt integrity, shrinkage, tensile strength, and puncture resistance. The Gurley number was less than 10 seconds, the sample did not shut down, had a melt integrity more than 190° C., shrinkage of less than 5%, tensile strength of less than 2% offset, and puncture resistance of more than 400 grams. The Gurley number prior to stretching of 2-4 mil (50-200 microns) thick material was measured and it was less than 200 seconds.

EXAMPLE 2

Except by replacing kaolin with calcined kaolin, the same formulation and procedures of Example 1 were repeated to obtain a microporous membrane.

We noticed that the oil dispersion of calcined kaolin is better than kaolin. The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 450 grams. The Gurley number prior to stretching of 2-4 mil (50-200 microns) thick material was measured and it was less than 200 seconds.

EXAMPLE 3

Except for using a dry blend mixture of 40% by weight of a UHMW polyethylene having Mw of $1\times10^6$, 10% by weight of a UHMW polyethylene having Mw of $3\times10^6$ and 50% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 480 grams. The Gurley number prior to stretching of 2-4 mil (50-200 microns) thick material was measured and it was less than 200 seconds.

EXAMPLE 4

Except for using a dry blend mixture of 20% by weight of a UHMW polyethylene having Mw of $1\times10^6$, and 80% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 200 grams. The Gurley number prior to stretching of 2-4 mil (50-200 microns) thick material was measured and it was less than 200 seconds.

EXAMPLE 5

Except for using a dry blend mixture of 80% by weight of a UHMW polyethylene having Mw of $1\times10^6$, and 20% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 800 grams. The Gurley number prior to stretching of 2-4 mil (50-200 microns) thick material was measured and it was less than 200 seconds.

EXAMPLE 6

Except for using a dry blend mixture of 40% by weight of a UHMW polyethylene having Mw of $1\times10^6$, 20% PP with melt index of less than 2 and 40% by weight calcined kaolin, the same procedures of Example 1 were repeated with a different process conditions. The dried microporous sheet was subsequently stretched in both directions at 140° C. for 100% and also heat set at 135° C., producing a 25 microns thick microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 550 grams. The Gurley number prior to stretching of 2-4 mil (50-200 microns) thick material was measured and it was less than 200 seconds.

EXAMPLE 7

Except for using a dry blend mixture of 50% by weight of a UHMW polyethylene having Mw of $3\times10^6$, and 50% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

EXAMPLE 8

Except for using a dry blend mixture of 50% by weight of a UHMW polyethylene having Mw of $5\times10^6$, and 50% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 600 grams. The Gurley number prior to stretching of 2-4 mil (50-200 microns) thick material was measured and it was less than 200 seconds.

EXAMPLE 9

Except for using a dry blend mixture of 50% by weight of a UHMW polyethylene having Mw of $5\times10^6$, 40% by weight of a UHMW polyethylene having Mw of about 800,000 and 10% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 146° C., had a melt integrity more than 190° C., shrinkage of less than 5%, tensile strength of less than 2% offset, puncture resistance of more than 550 grams. The Gurley number prior to stretching of 2-4 mil (50-200 microns) thick material was measured and it was less than 200 seconds.

EXAMPLE 10

Except for using a dry blend mixture of 40% by weight of a UHMW polyethylene having Mw of $5\times10^6$, 40% by weight of a UHMW polyethylene having Mw of about 300,000 and 20% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 135° C., had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

EXAMPLE 11

Except for using a dry blend mixture of 25% by weight of a UHMW polyethylene having Mw of $5\times10^6$, 70% by weight of a UHMW polyethylene having Mw of about 300,000 and 5% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 131° C., had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

These examples are summarized in the table appearing below.

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Formulation | | | | | | | | | | | |
| UHMWPE Mwt >1 million | 50% | 50% | 40% | 20% | 80% | 40% | | | | | |
| UHMWPE Mwt >3 million | | | 10% | | | | 50% | | | | 25% |
| UHMWPE Mwt >5 million | | | | | | | | 50% | 50% | 40% | |
| Polypropylene | | | | | | 20% | | | | | |
| HDPE Mwt 800 | | | | | | | | | 40% | | |
| HDPE Mwt 300 | | | | | | | | | | 40% | 70% |
| Kaolin | 50% | | | | | | | | | | |
| Calcined Kaolin | | 50% | 50% | 80% | 20% | 40% | 50% | 50% | 10% | 20% | 5% |
| Properties | | | | | | | | | | | |
| Thickness (microns) | 25 | 25 | 25 | 25 | 25 | 25 | 25 | 25 | 25 | 25 | 25 |
| Gurley (sec) | <10 | <10 | <10 | <10 | <10 | <10 | <10 | <10 | <10 | <10 | <10 |
| Shrinkage MD % | <5 | <5 | <5 | <5 | <5 | <5 | <5 | <5 | <5 | <5 | <5 |
| Shrinkage TD % | <5 | <5 | <5 | <5 | <5 | <5 | <5 | <5 | <5 | <5 | <5 |
| Shutdown Deg. C. | None | None | None | None | None | None | None | None | 148 | 135 | 131 |
| Melt Integrity Deg. C. | >190 | >190 | >190 | >190 | >190 | >190 | >190 | >190 | >190 | >190 | >190 |
| Puncture grams | >400 | >450 | >480 | >220 | >800 | >550 | >500 | >600 | >550 | >500 | >500 |
| Tensile % offset at 1000 psi | <2% | <2% | <2% | <2% | <2% | <2% | <2% | <2% | <2% | <2% | <2% |

While the invention has been described in detail and with reference to specific embodiments thereof, it will be apparent to one skilled in the art that various changes and modifications can be made therein without departing from the spirit and scope thereof. To cite only one of many possible examples, the ultra high molecular weight polyethylene can be replaced with a high-density polyethylene or a mixture of two or three ultra high molecular weight polyethylene and high-density polyethylene or other polyolefins, polyolefin copolymers or derivatives thereof and the kaolin filler or the mixture of $Al_2O_3$ and $SiO_2$ can be replaced by other suitable and property enhancing stable fillers.

What is claimed is:

1. A method for manufacturing a separator for a lithium-ion battery with resistance to thermal runaway and without shutdown, the method comprising the steps of:
    (a) mixing a dry-blend comprising 40% by weight of a ultra high molecular weight polyethylene having an average molecular weight of $1\times10^6$ or more, 20% by weight of polypropylene with a melt index of 2 or less, and 40% by weight of calcined kaolin to form a dry-blend mixture,
    (b) feeding the dry-blend mixture into an extruder;
    (c) melt-kneading the dry blend mixture in the extruder while feeding 60% by weight of liquid paraffin into the dry blend mixture, creating a solution thereby;
    (d) extruding the solution into the form of a sheet;
    (e) cooling the sheet, thereby producing a gel sheet including the liquid paraffin;

(f) extracting the liquid paraffin from the gel sheet and drying the gel sheet to form a dried gel sheet and retaining the calcined kaolin therein;
(g) stretching the dried gel sheet in both directions to form a stretched gel sheet; and
(h) heat setting the stretched gel sheet to form the separator having a melt integrity of at least 190° C., a puncture resistance of more than 550 grams, a tensile strength at 1000 psi of less than 2% offset and no shutdown temperature.

2. The method of claim 1, wherein the resulting separator has an air permeability of between 1 and 200 sec/10 cc.

3. The method of claim 2, wherein the resulting separator has an air permeability of less than 10 sec/10 cc.

* * * * *